Dec. 16, 1947. F. HOTCHNER 2,432,896
RETRO-REFLECTIVE ANIMATION DISPLAY
Filed March 12, 1945 2 Sheets-Sheet 1
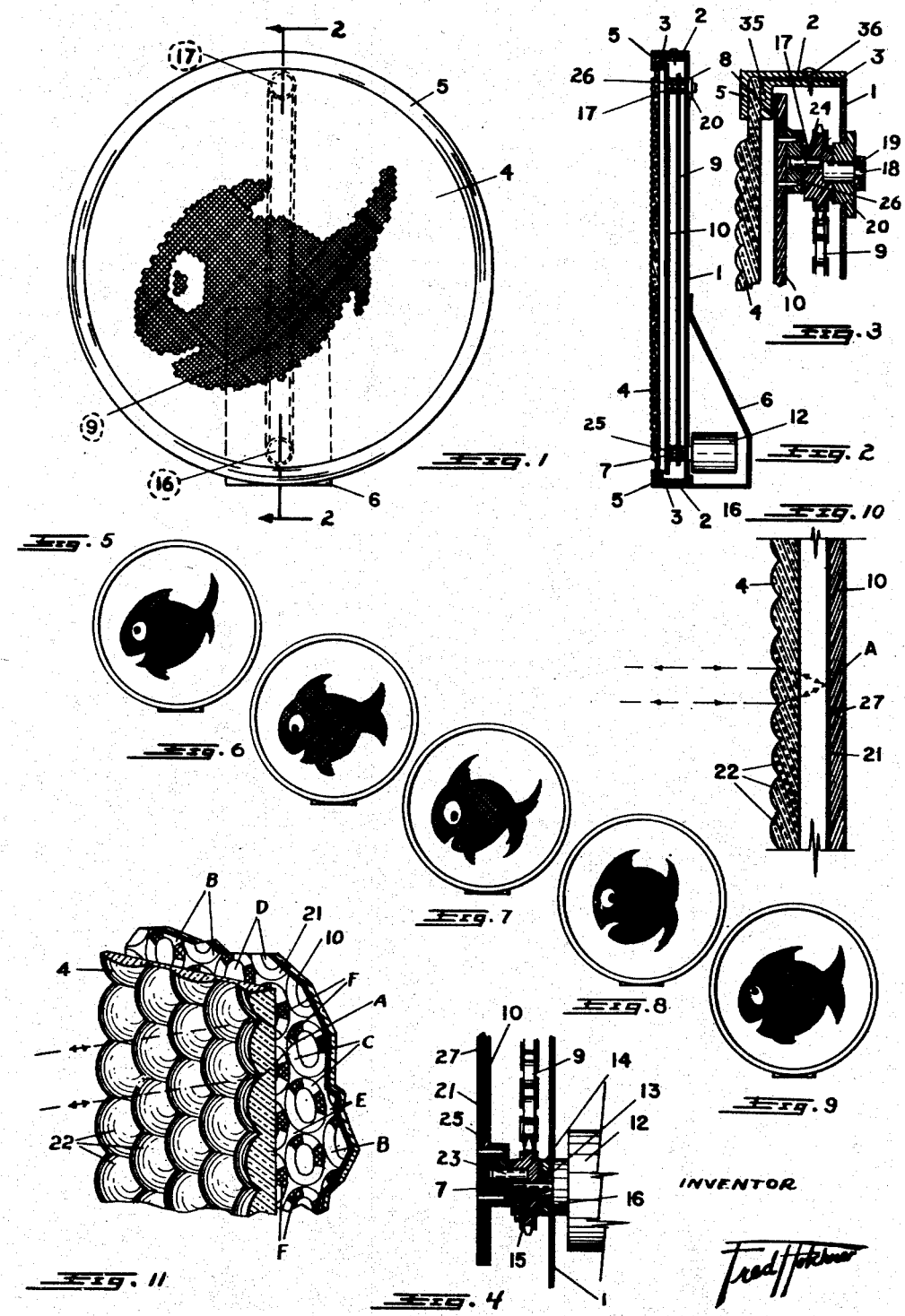
INVENTOR
Fred Hotchner Dec. 16, 1947.     F. HOTCHNER     2,432,896
RETRO-REFLECTIVE ANIMATION DISPLAY
Filed March 12, 1945     2 Sheets—Sheet 2
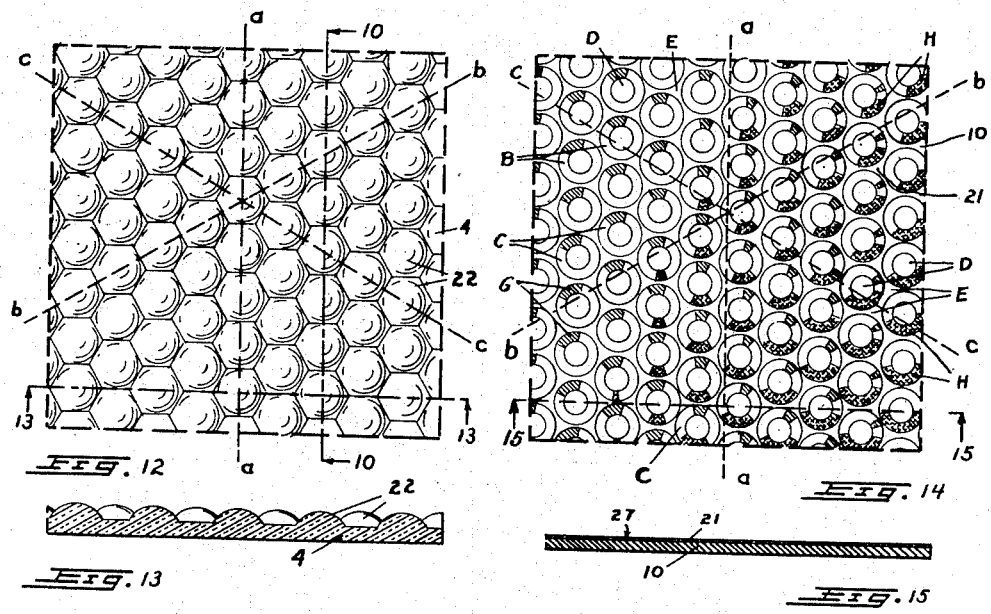

Patented Dec. 16, 1947

2,432,896

UNITED STATES PATENT OFFICE 2,432,896

RETROREFLECTIVE ANIMATION DISPLAY

Fred Hotchner, Los Angeles, Calif.

Application March 12, 1945, Serial No. 582,368

2 Claims. (Cl. 40—130)

This invention relates to an animated retro-reflective display device, that is, an apparatus which receives light rays coming from the general direction of the observer, modulates the rays and then returns them by reflection in the general direction of the observer, the modulation being so effected as to produce the illusion of animation over the display surface.

Numerous retro-reflective sign types are known in the prior art, finding their highest utility as highway or roadside signs which are rendered luminous to the view of riders of approaching cars by reflection of rays of the head light beams. It is an object of this invention to provide devices of this general type with the new feature of changeable copy and animation in realistic simulation of natural or fanciful objects in motion.

It is an object to produce a device of this character which will be capable of representing motion in any direction across the display surface, and at any speed from place to place over the display surface, and changing in direction and speed from instant to instant during the action as desired, and in any color or combination of colors, or changing in color, and in a variety of techniques of rendition.

It is an object to produce a device which will be simple and rugged in construction, reliable, and capable of operation over long periods of time with the minimum of attention. To this end I have contrived to produce all the various types of action effects described by the use of a single major moving element which will be light in weight and which will have an actual mechanical displacement of very small distance, generally a fraction of an inch for fairly large displays.

Another object is to produce a device in which the display subject or copy may be readily changed by the substitution of a new element for the old with very little work and expense.

A further object is to produce an animation device which will be capable of producing a continual motion effect by the repeated showing of a limited number of scenes, which effect will be realistic and free from monotonous repetition.

Various other objects of the invention will be apparent from the following specification taken in consideration of the accompanying drawings.

The invention is shown in a certain preferred embodiment in the accompanying drawings, in which the same reference numeral appearing in several views is used to indicate the same or the equivalent part throughout. In the drawings:

Figure 1 is a front elevation of a portable, stand type, retro-reflective display device made hereaccording. On the display surface is shown one scene of a sequence of scenes in black and white silhouette of an animation effect. The outlines of the object depicted are shown as following the boundaries of the individual lenses of the lens screen, producing a serrated effect when a single scene is viewed.

Figure 2 is a sectional elevation of the device taken along the section line 2—2 in Figure 1 showing the box construction, the mounting of the screens, and the driving mechanism.

Figure 3 is a cross section on an enlarged scale of the upper part of the box and the upper drive assemblage taken on the same section line as Figure 2.

Figure 4 is a cross section of the lower drive assemblage on the same scale as Figure 3 and on the same section line.

Figure 5 is a front elevation of the device on a scale reduced from that of Figure 1 showing the same scene on the display surface. As the scale is too small to show the serrated outlines of the object depicted, they are shown smooth. This view, together with Figures 6, 7, 8 and 9 show successive scenes of an animation effect which is typical of one kind of animation which may be had with this invention. It is noted that the action is continuous from Figure 9 through Figure 5 so that the motion is smooth and not broken by pauses or jumps in the motion of the object shown.

Figure 10 is a vertical cross section through the two screens shown in their proper relative positioning and showing a single beam of parallel rays incident on one of the lenses of the lens screen and focused on a point on the pattern screen, the beam being defined by broken lines. The arrow heads pointing in two directions are indicative of the fact that these lines also define the reflected beam. This section is taken along a plane passing through the centers of a vertical row of lenses as indicated by the section line 10—10 in Figure 12. The scale is substantially enlarged over the full size of the elements of portable displays.

Figure 11 is a fragmentary perspective view of the lens screen and the pattern screen operably positioned one to the other showing by broken lines the boundaries of a vertical section through a beam of light collected by one of the lenses, sectioned along the same plane, and projected to a focal point on its corresponding pattern on the pattern screen, the arrow heads along the broken lines pointing in the two directions being indicative of the fact that the same lines are used to trace both the incident and the reflected beam.

Figure 12 is a front elevation, similarly on an enlarged scale, of a portion of the lens screen to show the nesting of the lenses along three sets of center lines indicated by the reference lines a—a, b—b and c—c.

Figure 13 is a cross section of the same taken along the section line 13—13 in Figure 12.

Figure 14 is a front elevation of a portion of a pattern screen corresponding in scale to Figure 12 and showing an arrangement of patterns to produce a certain animation effect in color over this portion of the display surface. The effect which will be produced by the scanning of this portion of the pattern screen by the corresponding lenses of the lens screen will be a part of the larger effect over the whole display surface. The purpose of this illustration and that of the following views is to show how motion at any speed and in any direction may be represented over the display surface by the proper design of the patterns and also to show the use of changing colors in the effect. The patterns are spaced in the same order as the lenses shown in Figure 12.

Figure 15 is a cross section of the same taken along the section line 15—15 to show the construction of the screen and the location of the surface on which the patterns are inscribed.

Figures 16 and 17 are two views of the portion of the animation effect which will be observed on the portion of the lens screen shown in Figure 12 at two different stages in the operation of shifting one screen relative to the other with each lens scanning one of the patterns and moving around the circuit thereof simultaneously with all of the other lenses.

Figure 18 is a series of views on a reduced scale of the effect seen over the portion of the lens screen shown in Figure 12 when it is shifted relative to the portion of the pattern screen shown in Figure 14 in the manner stated above. The views are taken at 30 degree intervals around the circuits of the pattern starting at the tops of the patterns and moving clockwise therearound. Figure 16 is the enlarged view of that shown in Figure 18 and indicated as 0° while Figure 17 corresponds to the small view indicated as 120°.

While I describe my invention below in detail and with respect to a certain preferred embodiment thereof, I do not wish to be limited to the specific construction shown or the particular arrangement of parts insofar as permissible modifications under the broad ideas disclosed are concerned, since many changes and modifications thereof are possible and the invention may be embodied in widely varying forms without departing from the spirit and scope thereof in its broader aspects. Hence I desire to include all modifications and arrangements coming within the language and scope of any one or more of the appended claims.

The essential components of the embodiment of the invention shown in Figure 1 and associated views are: The lens screen and the pattern screen which are to be supported in parallel planes at a certain spacing from each other and moved one relative to the other in its plane in a certain manner described below, mechanism for effecting the movement described, and a container. In the preferred construction the lens screen is stationary and forms the front cover of the container.

The device of Figure 1 has the proportions and general construction of the typical portable stand sign for location in and around stores and in store windows. Being of the retro-reflective type it is most effective when positioned so as to throw back to the observer light which reaches it from the observer's general direction. Such a location as a back wall and under illumination of a spot light are suitable operating conditions. The general construction here shown, with such mechanical modifications as required by the special conditions of the case, may also be taken as typical of the device as constructed for roadside and other outdoor location.

The container is a shallow box having the back 1 and the rim 2. A spacer ring 3, positioned within the rim and in contact with the back, has an inturned flange 35. The rear surface of this flange serves as a guide for the movable pattern screen 10 and the front surface as a seat for the stationary lens screen 4. The clamp-down ring 5 holds the lens screen in place. The assemblage is secured by sheet metal screws at suitable intervals around the rim such as that indicated by 36.

The driving mechanism consists of the lower drive unit 7, shown in Figure 4 and the upper unit 8, shown in Figure 3, connected together by the chain 9. The motor 12 at the bottom of the box is held to the box back by means of the threaded hub 13 and lock nut 14 with the shaft 15 within the box, and the motor proper to the back. The cover 6 forms the motor compartment with the back of the box and forms also the back stand for the device.

The lower sprocket 16 is carried and driven by the motor shaft. The upper sprocket 17 with its stud shaft 18 and collar 19 idles in journal plate 20 secured to the back of the box. These sprockets each carry one of the eccentrically located stud pins 23 and 24, which turn in the journal plates 25 and 26 respectively, which plates are secured to the back of the pattern screen 10. The eccentricity of both pins is the same and equal to the mean radius of the patterns on the pattern screen. The sprockets are connected together by the chain so that both pins are held and driven in the same angular position, so that every point of the pattern screen is carried along a circuitous course the same as every other point.

The pattern screen rides against the rear surface of the flange 35 and the ends of the sprockets with just sufficient play for smooth operation. It is spaced from the lens screen so that the pattern bearing surface is at the focal plane of the lenses. It will be seen from this illustration that changes of effect may be made very quickly by opening the box and slipping the pattern screen off of the stud pins and inserting a new screen with different inscriptions. To insure accurate registry of the lenses with the patterns the lens screen may be cemented to the ring 5 or by any suitable mechanical attachment prevented from turning when the copy changes are made.

Referring now to Figure 10 we find the lens screen composed of a bank of plano-convex lenses 22. Generally this is desirable from the standpoint of cost as such a lens plate may be readily pressed or cast from glass or any of several available resins. However the double-convex form may be used, the smooth side of the plate may be turned out with the form shown, or any other desired modification adopted in adaptations to commercial conditions.

A beam of light incident on one of the lenses is indicated by broken lines. This beam is similarly indicated as converging to a focal point "A" on the front surface of the pattern screen. On this surface we see a thin layer 21 which carries the patterns and which is discussed below. If the light incident on the lens screen is perfectly parallel and the pattern screen perfectly perpendicular to the beam and perfectly reflecting, the reflected beam will be properly represented by the arrow heads pointed to the left in this figure. Actually the incident light will not be of perfectly pararllel rays and the conditions for perfect reflection will not be found in commercial constructions. As a matter of fact, perfect parallel reflection is not desired as this would restrict the showing to one narrow zone in front of the device. There will be a certain amount of divergence in any practical construction. It is sufficient if we attain the objective; that the showing is most effective straight forward of the sign over that zone which is the normal field of view for retro-reflective signs. These conditions are readily attained with this device by ordinary methods of construction.

It is to be noted also that the light spot which will be thrown onto the pattern screen will not be a point but a small bright region. The size of this lighted area will determine the number of scene changes which can be had with a given construction, the larger it is, the fewer the number of individual scenes which can be represented by the inscriptions around the courses of the patterns.

One suitable mode of construction of the pattern screen is to form it from a flat piece of metal with a smooth bright reflecting surface at 27. Over this is deposited a thin layer or film of light permeable material which is dyed, printed or painted to render it light modulating. Thus at those portions of the patterns where full reflection is desired the film is fully transparent. Light passes through it to the reflecting surface and back to the field of view unmodulated. At those portions of the patterns where no reflection is desired the film will be rendered opaque.

At those places where a colored effect is to be reproduced the layer will be colored so as to filter the light passing through it and pass only the desired rays. This layer, indicated by 21, may be formed as a decalcomania transfer and applied to the screen in the usual manner. Or it may be formed as a photographic emulsion layer and the impressions formed in it by any of the usual photographic techniques. Various other methods are available and known in the art for forming such layers.

Referring now to Figure 11 we have in perspective a portion of the lens screen and correspondingly a portion of a pattern screen with inscriptions which will reproduce an effect of black and white silhouette animation as the lens screen scans the patterns. On the pattern screen the patterns are those annular areas "B" which lie between the concentric circles. The areas indicated by "F" are dark, or opaque, and light falling on these areas is absorbed, and hence we have no reflection. The areas marked "C" are light, indicative of the requirement that they be as fully reflective as possible so that light falling on them is returned to the field of view to produce the bright areas of the scenes. It is seen that these dark and light areas have different angular lengths from place to place over the screen and hence dark shadows and light areas will be seen to move over the display surface in accordance with the interceptions of the incident beams which take place on the screen.

In operation, the pattern screen is shifted bodily by the movement of the sprockets so that each point of the screen moves along a circular path of diameter equal to the diameter of the broken lines circles seen in Figure 11. The pattern screen and the lens screen are positioned relative to each other so that each of the lenses focuses on the center line of its respective pattern as indicated by the broken line, all of the lenses focusing on the patterns in the same angular position at one instant, and all of the lenses keeping the same relative angular position around their respective patterns as the pattern screen is shifted. Thus, as the dark and light areas are of different angular lengths from place to place over the screen, at any instant of time, certain of the lenses will focus on light areas and hence appear white by magnification of the spots on which they fall, and similarly other lenses will focus on dark areas and consequently appear dark.

The areas marked "D" within the patterns and the areas marked "E," each of which falls between three adjacent patterns, are not involved in the effect and hence may be finished in any suitable fashion, or even left unfinished if desired.

Considering now Figures 12 and 13 it is seen that the lens distribution along banks of center lines, represented by the lines $a$—$a$, $b$—$b$ and $c$—$c$, 120° from each other, provides complete coverage of the display surface by the lenses so that all the light falling on the surface is used in the effect. Noting the serrated condition of the outlines reproduced in Figure 1 and Figures 16, 17 and 18, it is to be understood that each lens enters into the effect substantially as a unit with no detail over its area. That is to say, since it is at focal distance from the pattern, as it passes from one color on the pattern to a region of a different color the change which takes place to view occurs practically instantaneously over the entire surface of the lens. This accounts for the serrated effect of the outlines of the object depicted in Figure 1 and seen in Figures 16, 17 and 18. However, in practice, as the effect which is finally produced is that of motion simulated by the rapid showing of one scene after another, each scene being slightly different from the ones shown before and after, the effect is smoothed out to the view and in fact the impression of smooth detailing is heightened by the illusion of motion produced.

I have shown in Figure 14 an arrangement of patterns such as will make clear the manner in which motion in different directions at different speeds and in changing colors may be represented. The pattern arrangement is simplified for purposes of illustration, it being understood that many more changes may be produced in practice around the courses of the patterns.

As the pattern screen section shown is operated in the device in association with the lens screen in such fashion as to traverse all of the lenses simultaneously around the courses of the patterns in the same angular position relative to each other, the effect of motion in various directions is produced. The views in Figure 18 give the effect at certain intervals, to show the general action. Several times as many views may be taken to show the detailed changes as the action progresses, if desired. The views shown are sufficient to illustrate the variety of effects attainable with the device.

The patterns shown in Fig. 14 comprise the annular areas enclosed by the pairs of concentric circles, indicated by "B." The areas "D" and "E" are not reached by the beams thrown onto the screen by the lenses which originate at any point in the normal field and view, and are not scanned by the lenses to the view of persons in the normal field of view. These areas may therefore be treated in any desired fashion, being left uncoated, or obscured by a dark coating, as desired.

Along the courses of the patterns the areas marked "C" are left clear to indicate that they are of maximum reflectivity and hence appear white as they are magnified to view by the lenses during the action. The areas marked "G" are shaded in the convention for green and hence they will appear green by magnification at the proper time during the operation of the device. The areas marked "H" similarly are indicated as orange by the shading.

The patterns are arranged in a bank of the same order as the lenses shown in Figure 12, being distributed along three sets of parallel lines 120° from each other, which lines are represented by the lines a—a, b—b and c—c. Hence if the lenses of that portion of the lens screen which is shown in Figure 12 be positioned in front of that portion of the lens screen which is shown in Figure 14 at the proper focal distance and be centered over the patterns at any given section of the pattern circuit, they may each be brought to registry over a similar point of one of the patterns. By moving one of the screens in its plane along a circuitous course of the mean diameter of the patterns each lens may be caused to scan its pattern. Hence at each point of that course there will appear to view on the lens screen an enlarged image which will be a compound image made up of enlargements of a small portion of each of the patterns, all of which portions will at any stage in the operation be in the same general circuit position on all of the patterns.

If we thus operate the screens in association with each other so as to produce that image which is represented by the uppermost points of the patterns we have an image as shown in Figure 16. The outlines of the image will be serrated in following the boundaries of the lenses as each lens enlarges a portion of the pattern circuit with substantially no detailing over its individual area. If now one screen is shifted relative to the other so as to cause the lenses to scan the patterns in the clockwise direction we will have an amination effect reproduced on the lens screen as the different portions of the various patterns come into and go out of registry with the lenses. This effect is shown in approximation in the series of small views in Figure 18.

At 0° we have the showing of Figure 16 which is a green area extending from the left to a vertical boundary near the center of the image and a white area over the rest of the image. This green area is moving to the right, becoming a vertical strip of green which becomes narrower in the two next views marked 30° and 60° and vanishes near the right hand edge of the image. There are thus two different speeds in this part of the action. At 90° an orange shadow is seen moving from the right hand edge with a vertical boundary toward the left. At 120° we have the showing corresponding to that of Figure 17. The lower portion of this shadow moves faster so that when we reach 180° it has a boundary in an oblique position. It then recedes toward the lower right at a much higher speed.

At 270° the image is entirely white. At 300° the green shadow is found starting from the left hand edge of the image and moving toward the right. From this we demonstrate that motion in any direction and at any speed and in any color or color combination may be represented, limited only by the amount of space available along the patterns and the size of the area being scanned on each pattern at any instant. These factors have to do with the accuracy of construction, the width of the field of view to which the showing is to be made and other practical considerations. Under practical commercial conditions a sufficient number of changes may be had to produce very effective animation displays.

The mechanism is so arranged that the pattern screen is shifted along a circuitous course of the mean diameter of the patterns with the screen so positioned relative to each other that each of the lenses scans one of the patterns in the manner described above.

Having thus described my invention, what I claim is:

1. An exhibition device comprising: a pattern screen bearing a plurality of circuitous light reflective patterns each following the course of a closed circuit of outline common to all and distributed over the image bearing area of said screen, a lens screen positioned in front of said pattern screen and bearing a plurality of lenses conformed to condense light beams coming from the general direction of the normal field of view in front of said device into a plurality of separate beams convergent each to one of said patterns in a small section thereof and in the same general circuit position for all of the same and to condense rays reflected from the patterns into beams of relatively narrow divergence directed to the normal field of view, and means to shift one of said screens in its plane relative to the other screen along a course determined to cause each of said lenses to continuously scan its respective pattern, the reflectivity of said patterns varying from section to section around the circuits thereof and with respect to each other in proper manner to produce in each stage of the operation above described a distinct image to view by virtue of the modulation of the beams by the pattern sections from which they are reflected to the proper light values for the various portions of the image represented thereby.

2. An exhibition device comprising: a pattern screen bearing a plurality of circuitous light reflective patterns each following the course of a closed circuit of outline comon to all and distributed over the image bearing area of said screen, a lens screen positioned in front of said pattern screen and bearing a plurality of lenses conformed to condense light beams coming from the general direction of the normal field of view in front of said device into a plurality of separate beams convergent each to one of said patterns in a small section thereof and in the same general circuit position for all of the same and to condense rays reflected from the patterns into beams of relatively narrow divergence directed to the normal field of view, and means to shift one of said screens in its plane relative to the other screen along a course determined to cause each of said lenses to continuously scan its respective pattern, the reflectivity of said patterns varying from section to section around the circuits thereof and with respect to each other in proper manner to produce in each stage of the operation above described a distinct image to view by virtue of the modulation of the beams by the pattern sections from which they are reflected to the proper light values for the various portions of the image represented thereby, each image so produced being serially related to all the other images so produced in a sequence of image changes of an animation effect continually repeated by the cyclic traversing of said patterns by said beams.

FRED HOTCHNER.

REFERENCES CITED

The following references are of record in the file of this patent:

UNITED STATES PATENTS

| Number | Name | Date |
|---|---|---|
| 1,679,167 | Noland | July 31, 1928 |
| 1,792,731 | Craig | Feb. 17, 1931 |
| 1,816,459 | Adelmann | July 28, 1931 |
| 1,851,216 | Shipman | Mar. 29, 1932 |
| 1,987,357 | Gergen et al. | Jan. 8, 1935 |